United States Patent
Dorenbosch et al.

(10) Patent No.: US 6,757,269 B2
(45) Date of Patent: Jun. 29, 2004

(54) MOBILE WIRELESS ROUTER

(75) Inventors: Jheroen P. Dorenbosch, Paradise, TX (US); Vijaykumar M. Patel, Fairfax, VA (US)

(73) Assignee: Motorola, Inc., Schaumburg, IL (US)

(*) Notice: Subject to any disclaimer, the term of this patent is extended or adjusted under 35 U.S.C. 154(b) by 40 days.

(21) Appl. No.: 09/796,937

(22) Filed: Feb. 27, 2001

(65) Prior Publication Data

US 2002/0118663 A1 Aug. 29, 2002

(51) Int. Cl.[7] .................................................. H04Q 7/24
(52) U.S. Cl. .................................. 370/338; 370/352
(58) Field of Search ............................ 370/294, 310, 370/351–356, 389, 395.5, 395.52, 400–401; 455/403, 422, 426, 437, 445, 552–553

(56) References Cited

U.S. PATENT DOCUMENTS

| | | | |
|---|---|---|---|
| 6,055,236 A | | 4/2000 | Nessett et al. ............... 370/401 |
| 6,061,346 A | * | 5/2000 | Nordman ..................... 370/352 |
| 6,104,929 A | * | 8/2000 | Josse et al. .................. 455/445 |
| 6,108,314 A | * | 8/2000 | Jones et al. .................. 370/401 |
| 6,185,196 B1 | * | 2/2001 | Mademann ................. 370/327 |
| 6,272,148 B1 | * | 8/2001 | Takagi et al. ............... 370/469 |
| 6,469,998 B1 | * | 10/2002 | Burgaleta Salinas et al. ............... 370/338 |

FOREIGN PATENT DOCUMENTS

WO  WO 99/48315  *  9/1999

OTHER PUBLICATIONS

Project P946–GI, Smart Devices "When Things Start to Think", pp. 1–30, Jan .2000.*
Ohki, "Wireless Internet Access System", Sep. 20, 2001 US 2001/0022783 A1.*

* cited by examiner

Primary Examiner—Frank Duong
(74) Attorney, Agent, or Firm—Matthew C. Loppnow

(57) ABSTRACT

A mobile wireless router (100) includes a first wireless transceiver (102) for accessing a wireless packet data channel (206), and a network interface (106) for coupling to a first network (204). The mobile wireless router also includes a processor (104) coupled to the first wireless transceiver and coupled to the network interface for controlling and communicating with the first wireless transceiver and the network interface. The processor is programmed to provide an internet protocol (IP) router function to terminal equipment (TE) (202) coupled to the mobile wireless router through the first network, and is further programmed to appear, to another device (214) in a second network (220) coupled via the wireless packet data channel, to be an ordinary router.

20 Claims, 2 Drawing Sheets

MOBILE WIRELESS ROUTER

FIELD OF THE INVENTION

This invention relates in general to wireless communication systems, and more specifically to a mobile wireless router.

BACKGROUND OF THE INVENTION

Mobile stations (MSs), e.g., cellular handsets, recently have become able to obtain wireless connections to packet data networks, such as the Internet. A terminal equipment (TE) device, such as a printer, PDA, or notebook PC, can connect to an MS (through, for example, a cable, Bluetooth, or other wireless internet protocol (IP) technology such as IEEE 802.11x) and use the MS as a modem to connect to a wide-area network or communication infrastructure. This way, a client TE device can make a packet data connection through an MS to access a server on the Internet.

Several limitations are encountered when the MS is utilized in this manner. One limitation is that it is difficult to connect more than one TE device at a time to the MS. Another drawback is due to the fact that the connection through the MS is not transparent, because the connection process depends on the protocols and methods used by the mobile system. The MS will most likely also require non-IP protocols for connecting the client TE device. In addition, redundancy is limited: when the link between the MS and the mobile system infrastructure fails, non-standard methods must be used to connect the TE device to the infrastructure via another MS. It is also difficult to optimize the overall traffic flow. More than one MS may be able to provide Internet connectivity to the TE device. Some of the MSs may experience reduced capacity, as their cellular links will now not only carry the locally originated traffic (at the MS) but also the traffic to and from the TEs.

Thus, what is needed is a way to optimize traffic flow on the wireless connectivity between a TE device and a packet data network in a manner that is transparent, fully standardized, and less dependent on the reliability of the involved cellular infrastructure.

DETAILED DESCRIPTION OF THE DRAWINGS

Figure 1:
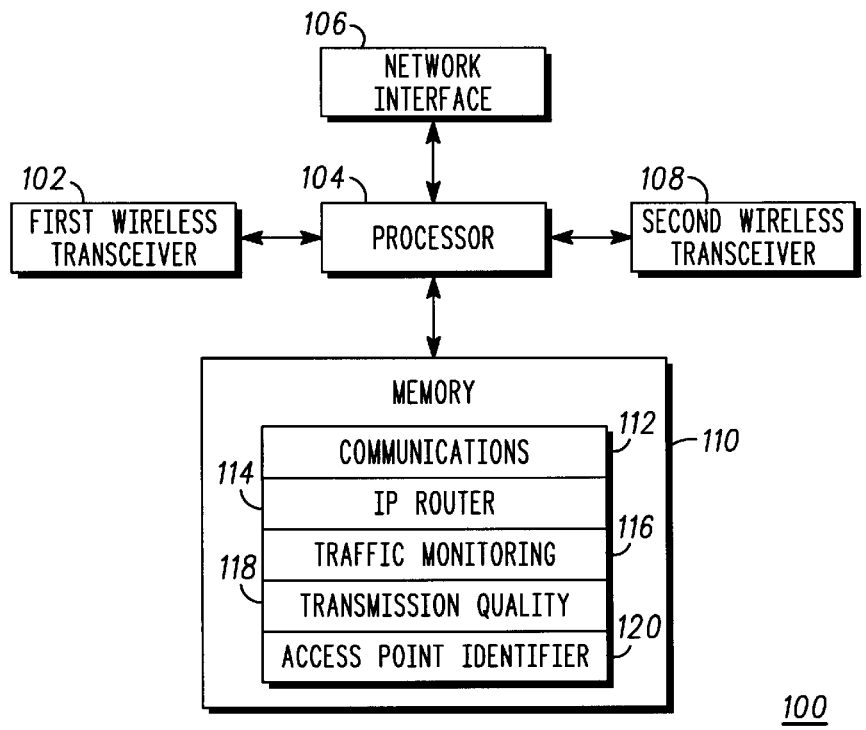
FIG. 1 is an electrical block diagram of an exemplary mobile wireless router in accordance with the present invention.
Figure 2:
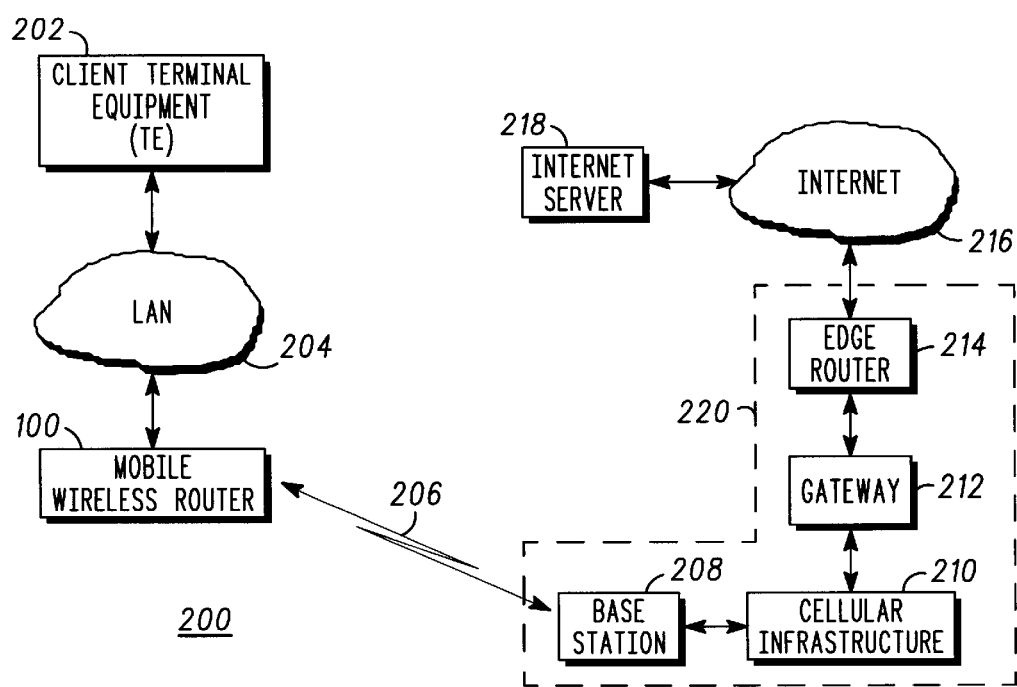
FIG. 2 is an electrical block diagram of an exemplary first communication system in accordance with the present invention.

Referring to FIG. 1, an electrical block diagram depicts an exemplary mobile wireless router 100 in accordance with the present invention. The mobile wireless router 100 comprises a conventional first wireless transceiver 102 for accessing a wireless packet data channel 206 (FIG. 2), preferably from a cellular telephone system having packet data capability. The mobile wireless router 100 further comprises a conventional network interface 106 for coupling to a first IP network 204 (FIG. 2). The network interface 106 preferably includes a conventional short range wireless transceiver (not shown), such as a Bluetooth transceiver, a Home RF transceiver, a wireless IP 801.11 transceiver, or and ETSI HyperLAN 2 transceiver for coupling to the first network 204, e.g., a wireless local area network (WLAN), through well-known techniques. It will be appreciated that, alternatively, the network interface 106 can include a wired transceiver, such as a Fast Ethernet transceiver, or a modem, for interconnecting with a wired LAN. The mobile wireless router 100 also preferably includes a second wireless transceiver 108 for connecting, via another wireless IP LAN 310, with a second mobile wireless router 100' (FIG. 3) similar to the mobile wireless router 100. The second wireless transceiver 108 is also preferably a short range wireless transceiver, such as a Bluetooth transceiver. It will be appreciated that, alternatively, the second wireless transceiver 108 can be another type of wireless transceiver that can communicate packet data, and can have a correspondingly different transmission range.

The mobile wireless router 100 further comprises a conventional processor 104 coupled to the first and second wireless transceivers 102, 108 and further coupled to the network interface 106 for controlling and communicating with the first and second wireless transceivers 102, 108 and the network interface 106. The mobile wireless router 100 also includes a conventional memory 110 coupled to the processor 104 which contains software for programming the processor 104 and space for storing variables used by the processor 104. The memory 110 comprises a communications program 112 for programming the processor 104 to cooperate with the first and second wireless transceivers 102, 108 and with the network interface 106 to control communications therewith in accordance with the present invention. The communications program 112 also preferably programs the processor 104 to activate a packet data protocol (PDP) context using at least one access point identifier to connect with at least one corresponding gateway 212 of a second network 220 (FIG. 2).

The obvious advantage of the mobile wireless router 100 is that it is mobile and thus can provide routing services to other mobile devices. The associated cost is that the mobile wireless router must cope with the changing conditions of the wireless environment of the second network 220. In one example, the mobile wireless router 100 must be able to connect to the second network 220 when first powered up and must be able to change networks while roaming. In another example the mobile wireless router 100 must be able to deal with the varying throughput on the wireless packet data channel 206.

When the mobile wireless router is powered up or roams into a new network, it must (re) establish a connection that allows it to provide the desired router functions. It must activate a packet data protocol (PDP) context to activate an IP address. This preferably is done using prior-art procedures like GPRS PDP context activation or CDMA 2000 PPP session establishment. It is important that the mobile wireless router activate a PDP context that provides connectivity via an appropriate gateway 212 to the desired network 216. (The desired network could be the Internet or a private network that is not easily accessible via the Internet). For this purpose the memory 110 also includes at least one access point identifier 120. The processor is programmed to use this identifier during the PDP context activation procedure to connect to an appropriate gateway.

The memory 110 also includes an internet protocol (IP) router program 114 comprising router algorithms for programming the processor 104 to provide an internet protocol (IP) router function to terminal equipment (TE) 202 (FIG. 2) coupled to the mobile wireless router 100 through the first network 204, and further programming the processor 104 to make the mobile wireless router 100 appear, to another device (e.g., edge router 214 (FIG. 2)) in the second network 220 coupled via the wireless packet data channel 206, to be an ordinary router.

Figure 3:
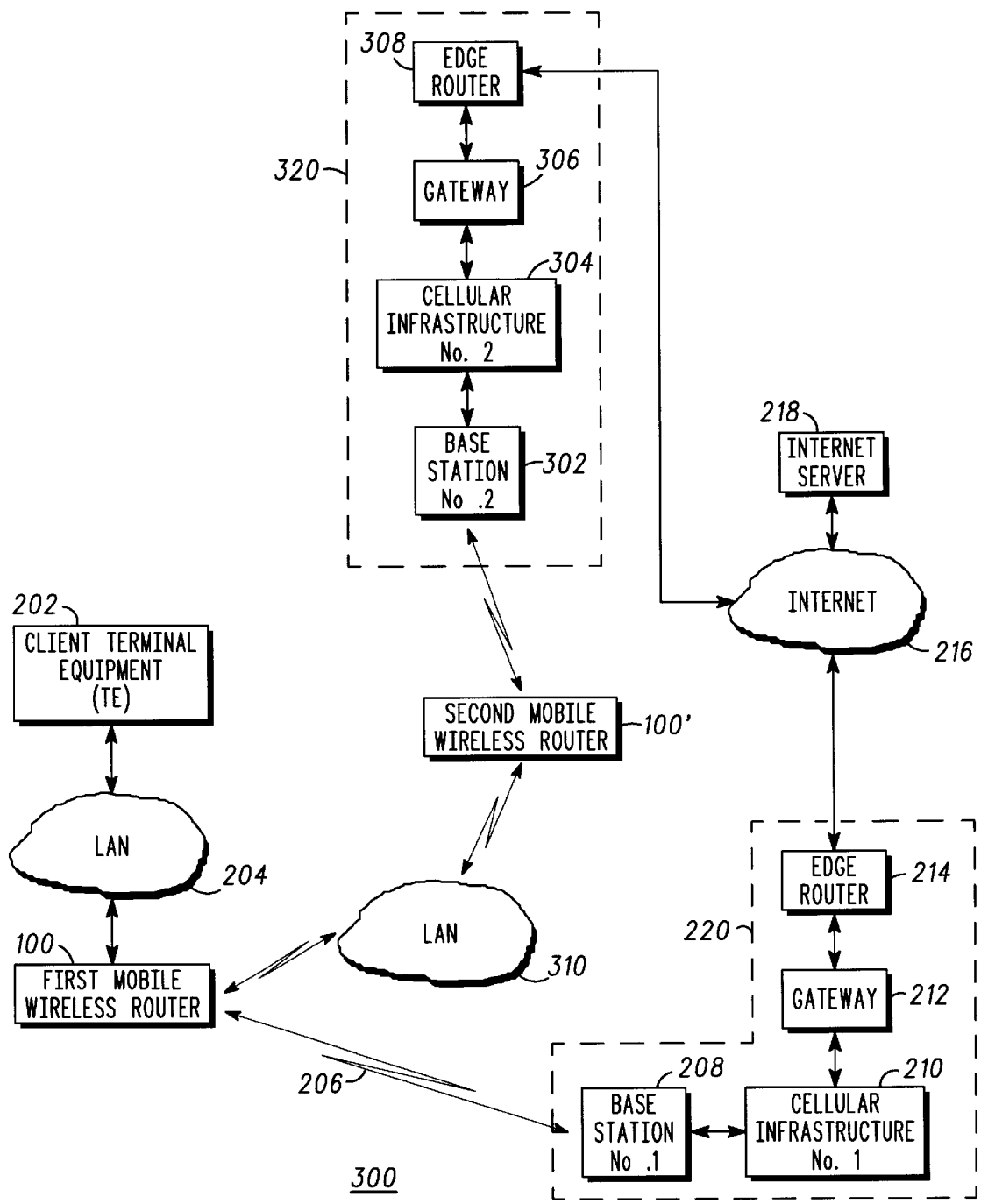
FIG. 3 is an electrical block diagram of an exemplary second communication system in accordance with the present invention.

The router program 114 preferably also programs the processor 104 to control the first wireless transceiver 102 to send a router-specific communication when the mobile wireless router first accesses the wireless packet data channel 206. The router-specific communication preferably is a Dynamic Host Configuration Protocol (DHCP) communication used by the mobile wireless router 100 to discover at least one other router 214 in the second network. The mobile wireless router 100 then informs the at least one other router 214 about other networks connected to the mobile wireless router 100, preferably using the Open Shortest Path First (OSPF) protocol. In addition, the router program 114 preferably programs the processor 104 to control the second wireless transceiver 108 to couple wirelessly through well-known techniques via the LAN 310 (FIG. 3) to a second mobile wireless router 100' which is coupled to a third network 320 (FIG. 3). It will be appreciated that the second and third networks can be the same network. The wireless LAN 310 between the first and second mobile wireless routers 100, 100' is preferably a short range wireless LAN, such as a Bluetooth LAN. It will be appreciated that, alternatively, other types of wireless LANs capable of packet data transmission can be utilized as well.

In addition, the memory 110 includes a traffic monitoring program 116 to program the processor 104 to route communication traffic of the TE 202 via the second mobile wireless router 100' to the third network 320 when the second network 220 is unable to handle said communication traffic, due, for example, to an outage or an overload. The traffic monitoring program 116 preferably also programs the processor 104 to route communication traffic of the TE 202 via the second mobile wireless router 100' to the third network 320 when the mobile wireless router 100 is unable to handle said communication traffic over the wireless packet data channel 206, for example, due to full use of the channel by the mobile wireless router 100 to support its own or others' ongoing communication needs, such as a multimedia call, or due to an outage.

The memory 110 also includes a transmission quality program 118 for programming the processor 104 to cooperate with the first wireless transceiver 102 to measure a current transmission quality of the wireless packet data channel 206, and to determine and store a current link metric based on the current transmission quality. The link metric can be, for example, a hop count metric used by a routing algorithm of the Routing Information Protocol (RIP). When the transmission quality of the wireless packet data channel 206 is poor, for example, the hop count associated with the connection is increased, thereby causing the communication system routers to favor another link instead of the wireless packet data channel 206. In addition, the transmission quality program 118 programs the processor 104 to compare the current link metric with an earlier stored link metric, and to advertise the current link metric to at least one neighbor router, when the current link metric and the earlier stored link metric differ by more than a predetermined amount. When the mobile wireless router 100 includes the second wireless transceiver 108, the transmission quality program 118 also programs the processor 104 to cooperate with the first wireless transceiver 102 to measure a current transmission quality of the wireless packet data channel 206, to estimate a current maximum transmission speed through the wireless packet data channel 206, based upon the current transmission quality; and, when necessary, to decide to route traffic through one of the wireless packet data channel 206 and the second mobile wireless router 100', based upon the current maximum transmission speed allowed. It will be appreciated that, additionally, the transmission quality program 118 can be arranged to measure the current transmission quality of the wireless coupling 310 between the first and second mobile wireless routers 100, 100' for comparison with the current transmission quality of the wireless packet data channel 206. The processor 104 can then select the better communication path to use, based on the measurements.

FIG. 2 is an electrical block diagram 200 of an exemplary first communication system in accordance with the present invention. The diagram 200 comprises a client terminal equipment (TE) 202, such as a desktop or laptop computer, coupled to a conventional LAN (the first network 204), which can be wired or wireless, coupled to the mobile wireless router 100 in accordance with the present invention. The mobile wireless router 100 is coupled through a wireless packet data channel 206 to the second network 220, comprising a conventional base station 208 coupled through a conventional cellular infrastructure 210 to a conventional gateway 212, and thence to a conventional edge router 214. The second network 220 is coupled to a wide area network, such as the Internet 216, for accessing an Internet server 218. An aspect of the present invention is that the mobile wireless router 100 preferably is arranged and programmed to utilize standard IP router algorithms, such that it appears and responds to the LAN 204 and to the edge router 214 just like an ordinary, wired IP router. This advantageously allows the TE 202 and the Internet server 218 to communicate transparently through standard IP techniques with no special measures required because of the use of the wireless packet data channel 206 for a portion of the connection. As disclosed in the Background of the Invention, the prior art has not allowed standard IP techniques with no special measures required for connecting a TE device wirelessly through a cellular telephone system to a packet data network, such as the Internet.

FIG. 3 is an electrical block diagram 300 of an exemplary second communication system in accordance with the present invention. The diagram 300 is similar to the diagram 200, the essential difference being the addition of the third network 320 comprising a base station 302, a second cellular infrastructure 304, a gateway 306, and an edge router 308 coupled to the Internet, and coupled to a second mobile wireless router 100'. The second mobile wireless router 100' is similar to the first mobile wireless router 100, and is coupled to the first mobile wireless router 100 through the wireless coupling 310. The arrangement depicted in the diagram 300 provides redundancy in that, when the wireless packet data channel 206 is unable to carry the instantaneous traffic load, some or all of the traffic can be diverted through the wireless link 310, the second mobile wireless router 100', and the third network 320. This advantageously provides link reliability and allows overall traffic flow to be optimized.

It will be appreciated that the second network 220 and the third network 320 can be operated by the same or different service providers, e.g., Sprint and S.W. Bell; and can utilize the same or different communication technologies, e.g., CDMA and GSM. It will be further appreciated that, while the exemplary second and third networks 220, 320 have depicted cellular infrastructures 210, 304, other types of communication system alternatively can be utilized. For example, at least one of the second and third networks 220, 320 can comprise a plurality of Bluetooth Smart Network Access Points (SNAPs) coupled to the Internet via a private infrastructure.

It should be clear from the preceding disclosure that the present invention provides an apparatus for optimizing traffic between a TE device and a wirelessly-connected packet data network in a manner that is advantageously transparent, fully standardized, and less dependent on the reliability of the cellular infrastructure.

Many modifications and variations of the present invention are possible in light of the above teachings. For example, in one embodiment, the second wireless transceiver 108 can be omitted. While redundancy is lost in this embodiment, the operational advantages of appearing and responding like an ordinary wired router can be retained. Thus, it is to be understood that, within the scope of the appended claims, the invention can be practiced other than as specifically described herein above.

What is claimed is:

1. A mobile wireless router, comprising:

a first wireless transceiver for accessing a wireless packet data channel;

a network interface for coupling to a first network; and a processor coupled to the first wireless transceiver and coupled to the network interface for controlling and communicating with the first wireless transceiver and the network interface, the processor programmed to provide an internet protocol (IP) router function to terminal equipment (TE) coupled to the mobile wireless router through the first network, and further programmed to appear, to another device in a second network coupled via the wireless packet data channel, to be an ordinary router, wherein the first wireless transceiver and the processor are arranged and programmed to cooperate to access the wireless packet data channel of a cellular telephone system, and wherein the mobile wireless router further comprises a second wireless transceiver coupled to the processor, wherein the processor is further programmed to control the second wireless transceiver to couple to a second mobile wireless router which is couple to a third network.

2. The mobile wireless router of claim 1, wherein the processor is further programmed to:

cooperate with the first wireless transceiver to measure a current transmission quality of the wireless packet data channel;

estimate a current maximum transmission speed through the wireless packet data channel, based upon the current transmission quality; and decide to route a communication through one of the wireless packet data channel and the second mobile wireless router, based upon the current maximum transmission speed.

3. The mobile wireless router of claim 1, wherein, in response to accessing the wireless packet data channel, the processor is further programmed to activate a packet data protocol (PDP) context using at least one access point identifier to connect with at least one corresponding gateway of the second network.

4. The mobile wireless router of claim 1, wherein the processor is further programmed to route communication traffic of the TE via the second mobile wireless router to the third network, when the second network is unable to handle said communication traffic.

5. The mobile wireless router of claim 1, wherein the processor is further programmed to control the first wireless transceiver to send a router-specific communication when the mobile wireless router accesses the wireless packet data channel.

6. The mobile wireless router of claim 1, wherein the processor is further programmed to route communication traffic of the TE via the second mobile wireless router to the third network, when the mobile wireless router is unable to handle said communication traffic over the wireless packet data channel.

7. A mobile wireless router, comprising:

first wireless transceiver means for accessing a wireless packet data channel;

network interface means for coupling to a first network; and processor means coupled to the first wireless transceiver means and coupled to the network interface means for controlling and communicating with the first wireless transceiver means and the network interface means, the processor means programmed to provide an internet protocol (IP) router function to terminal equipment (TE) coupled to the mobile wireless router through the first network, and further programmed to appear, to another device in a second network coupled via the wireless packet data channel, to be an ordinary router, wherein the first wireless transceiver means and the processor means are arranged and programmed to cooperate to access the wireless packet data channel of a cellular telephone system, and wherein the mobile wireless router further comprises a second wireless transceiver means coupled to the processor means, wherein the processor means is further programmed to control the second wireless transceiver means to couple to a second mobile wireless router which is coupled to a third network.

8. The mobile wireless router of claim 7, wherein the processor means is further programmed to route communication traffic of the TE via the second mobile wireless router to the third network, when the mobile wireless router is unable to handle said communication traffic over the wireless packet data channel.

9. The mobile wireless router of claim 7, wherein the processor means is further programmed to route communication traffic of the TE via the second mobile wireless router to the third network, when the second network is unable to handle said communication traffic.

10. The mobile wireless router of claim 7, wherein the processor means is further programmed to:

cooperate with the first wireless transceiver means to measure a current transmission quality of the wireless packet data channel;

estimate a current maximum transmission speed through the wireless packet data channel, based upon the current transmission quality; and decide to route a communication through one of the wireless packet data channel and the second mobile wireless router, based upon the current maximum transmission speed.

11. The mobile wireless router of claim 7, wherein the processor means is further programmed to control the first wireless transceiver means to send a router-specific communication when the mobile wireless router accesses the wireless packet data channel.

12. The mobile wireless router of claim 7, wherein, in response to accessing the wireless packet data channel, the processor means is further programmed to activate a packet data protocol (PDP) context using at least one access point identifier to connect with at least one corresponding gateway of the second network.

13. A mobile wireless router, comprising:

a first wireless transceiver for accessing a wireless packet data channel;

a network interface for coupling to a first network; and a processor coupled to the first wireless transceiver and coupled to the network interface for controlling and communicating with the first wireless transceiver and the network interface, the processor programmed to provide an internet protocol (IP) router function to terminal equipment (TE) coupled to the mobile wireless router through the first network, and further programmed to appear, to another device in a second network coupled via the wireless packet data channel, to be an ordinary router, wherein the first wireless transceiver and the processor are arranged and programmed to cooperate to access the wireless packet data channel of a cellular telephone system, wherein the processor is further programmed to establish a connection when the mobile wireless router roams into a new network, and wherein the mobile wireless further comprises a second wireless transceiver coupled to the processor, wherein the processor is further programmed to control the second wireless transceiver to couple to a second mobile wireless router which is coupled to a third network.

14. The mobile wireless router of claim 13, wherein, in response to accessing the wireless packet data channel, the processor is further programmed to activate a packet data protocol (PDP) context using at least one access point identifier to connect with at least one corresponding gateway of the second network.

15. The mobile wireless router of claim 13, wherein the processor is further programmed to control the first wireless transceiver to send a router-specific communication when the mobile wireless router accesses the wireless packet data channel.

16. The mobile wireless router of claim 13, wherein the processor is further programmed to:

cooperate with the first wireless transceiver to measure a current transmission quality of the wireless packet data channel;

estimate a current maximum transmission speed through the wireless packet data channel, based upon the current transmission quality; and decide to route a communication trough one of the wireless packet data channel and the second mobile wireless router, based upon the current maximum transmission speed.

17. The mobile wireless router of claim 13, wherein the processor is farther programmed to route communication traffic of the TE via the second mobile wireless router to the third network, when the second network is unable to handle said communication traffic.

18. The mobile wireless router of claim 13, wherein the processor is further programmed to route communication traffic of the TB via the second mobile wireless router to the third network, when the mobile wireless router is unable to handle said communication traffic over the wireless packet data channel.

19. A mobile wireless router, comprising:

a first wireless transceiver for accessing a wireless packet data channel;

a network interface for coupling to a first network; and a processor coupled to the first wireless transceiver and coupled to the network interface for controlling and communicating with the first wireless transceiver and the network interface, the processor programmed to provide an internet protocol (IP) router function to terminal equipment (TE) coupled to the mobile wireless router through the first network, and further programmed to appear, to another device in a second network coupled via the wireless packet data channel, to be an ordinary router, wherein the processor is further programmed to:

cooperate with the first wireless transceiver to measure a current transmission quality of the wireless packet data channel;

determine and store a current link metric based on the current transmission quality;

compare the current link metric with a previously stored link metric; and advertise the current link metric to at least one neighbor router, when the current link metric and the previously stored link metric differ by more than a predetermined amount.

20. A mobile wireless router, comprising:

first wireless transceiver means for accessing a wireless packet data channel;

network interface means for coupling to a first network; and processor means coupled to the first wireless transceiver means and coupled to the network interface means for controlling and communicating with the first wireless transceiver means and the network interface means, the processor means programmed to provide an internet protocol (IP) router function to terminal equipment (TE) coupled to the mobile wireless router through the first network, and further programmed to appear, to another device in a second network coupled via the wireless packet data channel, to be an ordinary router, wherein the processor means is further programmed to:

cooperate with the first wireless transceiver means to measure a current transmission quality of the wireless packet data channel;

determine and store a current link metric based on the current transmission quality;

compare the current link metric with a previously stored link metric; and advertise the current link metric to at least one neighbor router, when the current link metric and the previously stored link metric differ by more than a predetermined amount.

\* \* \* \* \*